United States Patent
Eguchi et al.

(10) Patent No.: US 7,453,236 B2
(45) Date of Patent: Nov. 18, 2008

(54) BATTERY PACK OF AUTOMATICALLY SETTING MASTER AND SLAVE PACK, MULTI-BATTERY PACK SYSTEM INCLUDING THE SAME AND METHOD FOR CONTROLLING THE SAME

(75) Inventors: Yasuhito Eguchi, Daejeon (KR); Shoji Tanina, Tokyo (JP); Young Joon Shin, Daejeon (KR); Chang Eon Jin, Osan-si (KR); Jin Seok Heo, Seogwipo-si (KR)

(73) Assignee: LG Chem, Ltd. (KR)

( * ) Notice: Subject to any disclaimer, the term of this patent is extended or adjusted under 35 U.S.C. 154(b) by 67 days.

(21) Appl. No.: 11/551,478

(22) Filed: Oct. 20, 2006

(65) Prior Publication Data
US 2007/0090793 A1    Apr. 26, 2007

(30) Foreign Application Priority Data
Oct. 21, 2005    (KR) ...................... 10-2005-0099728

(51) Int. Cl.
H01M 10/44 (2006.01)
H01M 10/46 (2006.01)

(52) U.S. Cl. ..................................... 320/116
(58) Field of Classification Search ................ 320/112, 320/114, 116, 118, 120
See application file for complete search history.

(56) References Cited

U.S. PATENT DOCUMENTS 5,717,937 A * 2/1998 Fritz .......................... 713/300
6,882,129 B2 * 4/2005 Boskovitch et al. ......... 320/119

FOREIGN PATENT DOCUMENTS

JP    10321535    12/1998
JP    2000-294298    10/2000

* cited by examiner

*Primary Examiner*—Edward Tso
(74) *Attorney, Agent, or Firm*—Cantor Colburn LLP (57) ABSTRACT

Disclosed are a multi-battery pack system, a method for controlling battery packs, and a battery pack, in which plural battery packs provided in the multi-battery pack system can be set as a master battery pack and slave battery packs by themselves. The method for controlling the battery packs constructing the multi-battery pack system includes: a first step of checking if a communication line is maintained at a first level for a first desired amount of time when an activation signal or a message of setting a master battery pack is received; and a second step of outputting signals of a second level to the communication line for a second desired amount of time when the communication line is maintained at the first level for the first desired amount of time, and setting a battery pack as a master battery pack.

15 Claims, 5 Drawing Sheets

BATTERY PACK OF AUTOMATICALLY SETTING MASTER AND SLAVE PACK, MULTI-BATTERY PACK SYSTEM INCLUDING THE SAME AND METHOD FOR CONTROLLING THE SAME

This application claims the benefit of the filing date of Korean Patent Application No. 2005-99728, filed on Oct. 21, 2005, in the Korean Intellectual Property Office, the disclosure of which is incorporated herein in its entirety by reference.

BACKGROUND OF THE INVENTION

1. Field of the Invention

The present invention relates to a battery pack, and more particularly to a multi-battery pack system, a method for controlling the same, and a battery pack, in which the battery packs can be set as a master battery pack and slave battery packs by themselves.

2. Description of the Prior Art

Generally, portable electronic devices including portable telephones, laptop computers, digital cameras and the like, have used a battery pack, which contains a plurality of rechargeable cells, as an electric power source.

Recently, battery packs have been connected in parallel to supply sufficient capacity of electricity to a portable electronic device in order to secure a stable operation of the portable electronic device. In addition, a multi-battery pack system has been proposed to correspond to a variety of portable electronic devices.

As the multi-battery pack system has been realized in which a variable number of the battery packs can be contained, there is a problem in that it is difficult to control the multi-battery pack system.

In order to solve the problem, Japanese Patent No. 3405526 discloses an electric source using multi-battery packs. In the electric source using the multi-battery packs, each of the multi-battery packs has a plurality of cells and a circuit for checking charge and discharge state of the cells or controlling charge and discharge of the cells. The electric source using the multi-battery packs includes a master battery pack and a plurality of slave battery packs. The master battery pack requests that the slave battery packs transmit data indicating the charge and discharge state with communication, manages the entire data, identifies the charge and discharge state so as to transmit a command, and controls the charge and discharge of the slave battery packs. The slave battery packs transmits data indicating the charge and discharge state in response to the request of the master battery pack, and receives the command from the master battery pack to carry out the charge and discharge thereof.

According to the conventional art, the master battery pack controls the charge and discharge of the plural slave battery packs. When the master battery pack is detached from the electronic device or fully discharged, the master battery pack does not normally operate. In this case, there is a problem in that it is impossible to control the slave battery pack as well as the master battery pack. Further, even when plural battery packs are set as the master battery pack by mistake, a corresponding multi-battery pack system cannot normally operate.

Further, in the case where the setting position of the master battery pack is determined, if the master battery pack does not normally operate because of the detachment from the electronic device or the complete discharge, it is impossible to control the slave battery packs as well as the master battery pack.

Accordingly, the development of technology is required to enable the battery packs for the multi-battery pack system to be set as a master battery pack and slave battery packs automatically.

Further, the development of technology is required to the battery packs to be set as a master battery pack and slave battery packs so that the multi-battery pack system can normally operate, even though the master battery pack is absent or malfunctions.

SUMMARY OF THE INVENTION

Accordingly, the present invention has been made to solve the above-mentioned problems occurring in the prior art, and it is an object of the present invention to provide a multi-battery pack system, a method for controlling the same, and a battery pack, in which plural. battery packs for the multi-battery pack system can be set as a master batter pack and slave battery packs by themselves.

It is another object of the present invention to provide a multi-battery pack system, a method for controlling the same, and a battery pack, in which the battery packs can be set as a master battery pack and slave battery packs so that the multi-battery pack system can normally operate even though the master battery pack is absent or malfunctions.

In order to accomplish these objects of the present invention, according to an embodiment of the present invention, there is provided a method for controlling the battery packs constructing the multi-battery pack system, which includes: a first step of checking if a communication line is maintained at a first level for a first desired amount of time when an activation signal or a message of setting a master battery pack is received; and a second step of outputting signals of a second level to the communication line for a second desired amount of time when the communication line is maintained at the first level for the first desired amount of time, and setting a battery pack as a master battery pack.

According to the present invention, even though the master battery pack is detached from the multi-battery pack system or malfunction during use of the multi-battery pack system, the batter packs can be set as the master and slave battery packs by themselves, so that the multi-battery pack system can stably operate.

According to the present invention, in the case where the master battery pack is detached from the multi-battery pack system or malfunction during use of the multi-battery pack system, the batter packs can be reset as the master and slave battery packs by themselves, so that the multi-battery pack system can stably operate.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described in detail with reference to the accompanying drawings.

Figure 1:
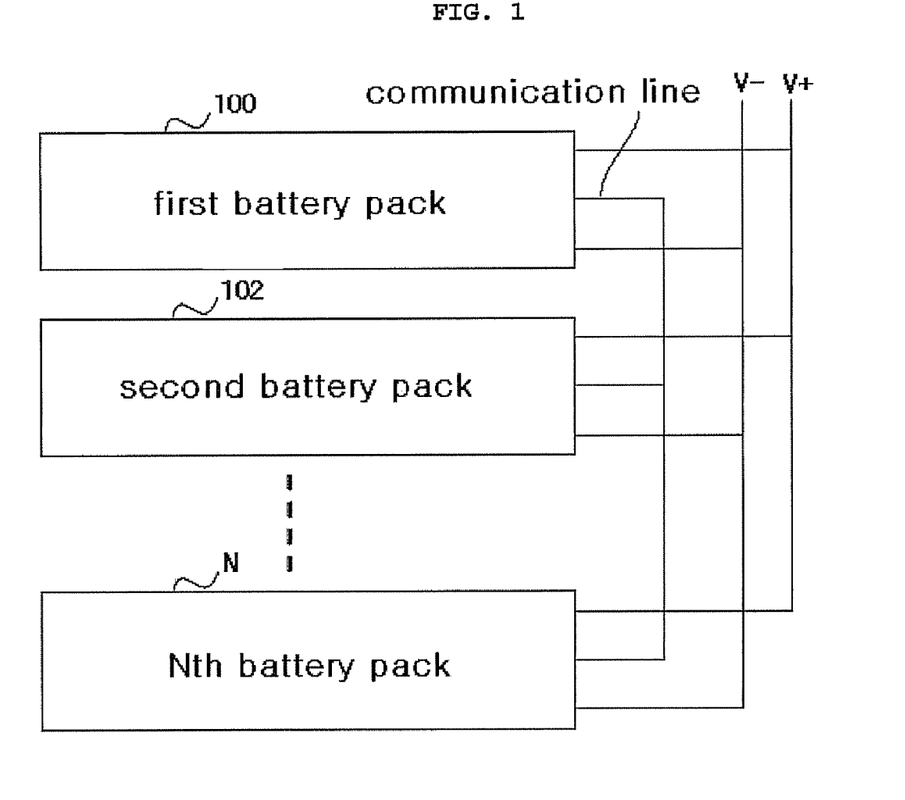
FIG. 1 is a block diagram showing the configuration of a multi-battery pack system according to the preferred embodiment of the present invention.

FIG. 1 is a block diagram showing the configuration of a multi-battery pack system according to the preferred embodiment of the present invention.

Referring to FIG. 1, the multi-battery pack system includes first, second, . . . , and $N^{th}$ battery packs 100, 102, . . . , and N.

The first, second, . . . , and $N^{th}$ battery packs 100, 102, . . . , and N carry out a process for setting themselves as a master battery pack and slave battery packs according to the preferred embodiment of the present invention, when they are activated or receive a message requiring them to reset a master battery pack.

The battery pack, which has been set as the master battery pack according to the process for setting the master battery pack and the slave battery packs, communicates with the slave battery packs through communication lines, so as to control the slave battery packs.

More specifically, the master battery pack requests the slave battery packs to transmit information on total voltage TTLV every time when a desired time lapses. When the slave battery packs provide the master battery packs with the information on the total voltage TTLV according to the request of the master battery pack, the master battery pack calculates a target voltage TGTTLV based on its total voltage TTLV and the total voltage TTLV of the slave battery packs and transmits the target voltage to the slave battery packs.

Then, the master battery pack compares the target voltage TGTTLV with its total voltage TTLV, and connects or separates an output terminal to/from a cell group according to the result of comparison. Specially, the master battery pack selectively controls the switching element of a switch according to a charging or discharging mode.

As receiving the target voltage from the master battery pack, the slave battery packs compares the target voltage TGTTLV with its total voltage TTLV and connects or separates the output terminal to/from the cell group depending on the result of the comparison. Specially, the slave battery packs selectively control the switching elements of a switch according to the charging or discharging mode.

Here, when the switches of the master battery pack and the slave battery packs connect the cell group to output terminals V+ and V−, the battery packs are connected in parallel on the basis of the output terminals V+ and V−.

Figure 2:
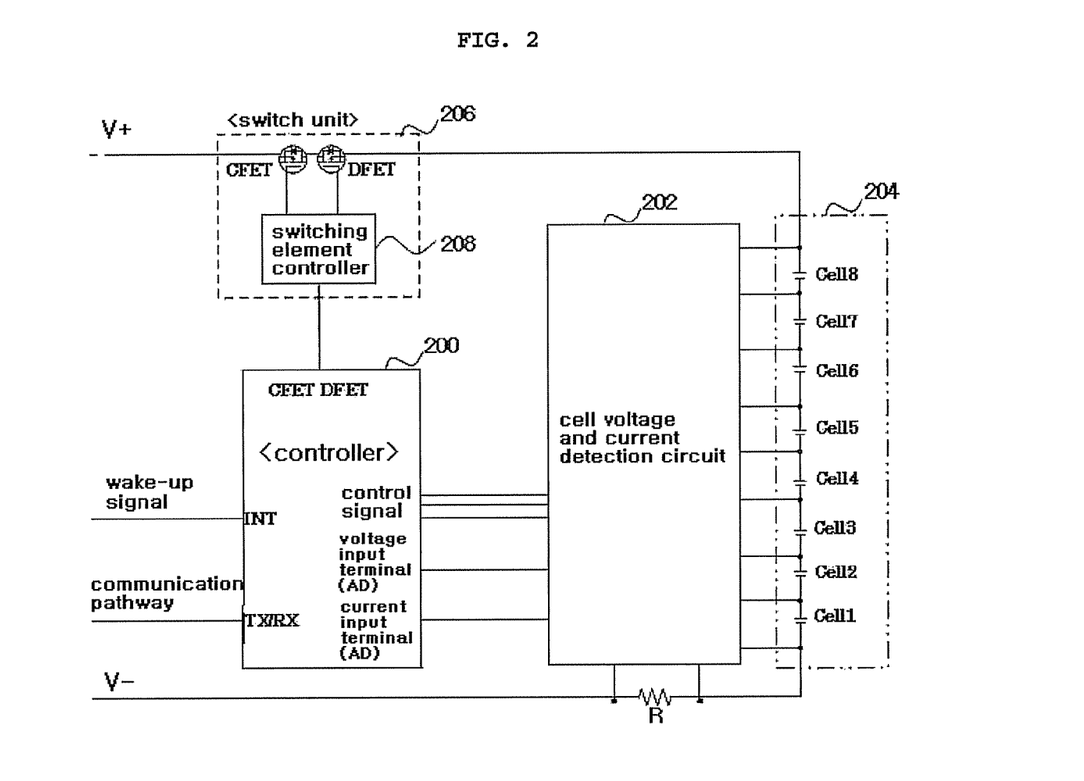
FIG. 2 is a circuit diagram showing the detailed configuration of a battery pack according to the preferred embodiment of the present invention.

Since the first, second, . . . , and $N^{th}$ battery packs 100, 102, . . . , and N have the same structure and operation with one another, the configuration of only one battery pack will be describe in detail with reference to FIG. 2.

The controller 200 of the battery pack checks if the level of the communication line is the first level (high level) for the first desired time RXTH, when the battery pack is activated or receives a message of resetting a battery pack as the master batter. If the communication line is high level during the first desired time RXTH, the controller 200 determines that the master battery pack is absent, and outputs through the communication line a signal of the second level (low level) indicating that it is the master battery pack for the second desired time TXLTA. After outputting the signal of the second level for the second desired time TXLTA through the communication line, the controller 200 outputs the signal of the first level (high level) through the communication line again and then checks if the level of the communication line is the first level. If the level of the communication line is the first level, the controller 200 determines that another battery pack does not try to set it as the master battery pack and sets its own battery pack as the master battery pack. Then, the controller 200 notifies other battery packs that its own battery pack is set as the master battery pack.

Here, if the first desired time RXTH is set to 120 msec, the period to identify the lasting state of the level becomes shorter than the length of 1 bit of a communication format.

The second desired time TXLTA is differently set for each battery pack. The reason for that is to set only one battery pack as the master battery pack even though the battery packs attempt to set themselves as the master battery pack.

If the level of the communication line is the second level (low level) even though the controller 200 changes the level of the signal output through the communication line from the second level (low level) to the first level (high level), the controller 200 determines that other battery packs are attempting to set themselves to be the master battery pack. Thus, the controller 200 waits for a message of indicating that another battery pack is set as the master battery pack, and sets its own battery pack as the slave battery pack according to the message.

Also, when the controller 200 is activated, or receives a message of resetting the master battery pack, if the communication lines are not at the first level (high level) for the first desired time RXHT (step 300), the controller 200 determines that other battery packs are attempting to set themselves to be the master battery pack, the controller 200 waits for a message of indicating that another battery pack is set as the master battery pack, and sets its own battery pack as the slave battery pack according to the message.

On the other hand, it is understood that if a battery pack of which the level has been changed from the second level (low level) to the first level (high level) is set as the master battery pack, residual battery packs are set as slave battery packs without an attempt to set themselves as the master battery pack.

Further, the controller 200 receives total voltage TTLV from the slave battery packs if its own batter pack is set as the master battery pack. The controller 200 also receives the total voltage TTLV of the master battery pack from a cell voltage and current detection circuit 202, calculates a target voltage TGTTLV for the entire battery packs, and transmits the calculated target voltage TGTTLV to the slave battery packs. In addition, the controller 200 controls a switching unit 206 based on the target voltage TGTTLV.

Further, the controller 200 transmits the total voltage TTLV to the master battery pack according to the request of the master battery pack if its own battery pack is set as the slave battery pack. In addition, the controller 200 controls the switching unit 206 based on the target voltage TGTTLV which is provided by the master battery pack.

Furthermore, the controller 200 is connected to other battery packs through communication lines and carries out serial communication according to RS 232.

A communication format according to the present invention consists of a start of 1 bit, data of 8 bits, and an end of 1 bit and has a communication speed of 9600 bps. Here, in the preferred embodiment of the present invention, the serial communication according to the RS 232 is mentioned as an example. However, it will be understood that various communication ways including I²C, etc. can be employed to the present invention.

In the preferred embodiment of the present invention, processes for setting the master battery pack and the slave battery packs are performed through the communication lines. However, it will be understood that the multi-battery pack system is provided with separate dedicated lines used for setting the master battery pack and the slave battery packs, so as to perform processes for setting the master battery pack and the slave battery packs.

The controller 200 receives the value of voltage relating to each of cells 1, 2, 3, 4, 5, 6, 7, and 8 which belong to a cell group 204 from a cell voltage and current detection circuit 202, and calculates the total voltage TTLV of its own battery.

Furthermore, the controller 200 enables the switching unit 206 to connect output terminals V+ and V– to both ends of the cell group 204 in which the multiple cells 1, 2, 3, 4, 5, 6, 7, and 8 are connected in series.

The switching unit 206 includes a charging switch element CFET and discharging switch element DFET connected to the cell group 204 and the output terminal V+ in series, and a switch element controller 208. The switch element controller 208 controls the charging switch element CFET and the discharging switch element DFET according to the control of the controller 200. Specifically, in a charging mode, the charging switch element CFET is turned on. In a discharging mode, the discharging switch element DFET is turned on. The configuration and operation of the switching unit 206 is already known and disclosed in Japanese Laid-open Patent Publication No. H10-321535. Thus, the description of the switching unit will be omitted.

The cell voltage and current detection circuit 202 detects the voltage and current of each of the cells 1, 2, 3, 4, 5, 6, 7, and 8 which belong to the cell group 204, and inputs the voltage and current into Analog to Digital terminals of the controller 200. Specially, a current sensing resistor R is connected to the cell group 204 and the output terminals in series. Hence, the cell voltage and current detection circuit 202 can calculate current by measuring voltage difference of both ends of the current sensing resistor R.

The cell group 204 includes the chargeable cells 1, 2, 3, 4, 5, 6, 7, and 8 which are connected in series.

Figure 3:
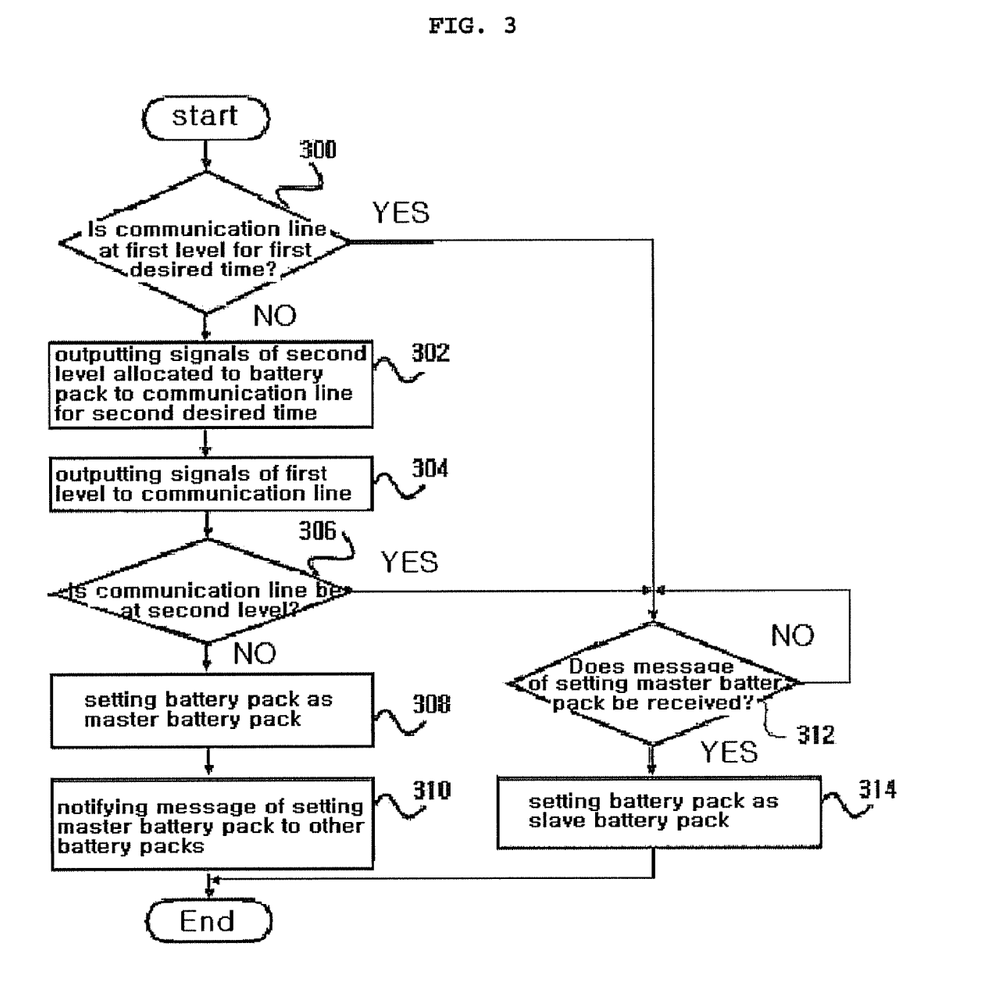
FIG. 3 is a flowchart illustrating processes for setting a master battery pack and a slave battery pack according to the preferred embodiment of the present invention.

Hereinafter, the method for setting the master battery pack and the slave battery pack according to the preferred embodiment of the present invention will be described with reference to the flowchart of FIG. 3.

When the controller 200 of each of the first, second, . . . , and $N^{th}$ battery packs 100, 102, . . . , and N is activated, or receives a message of setting the master battery pack, it checks if the communication lines are at the first level (high level) for the first desired time RXHT (step 300).

If the communication lines are at the second level (low level) or are not at the first level (high level) for the first desired time RXHT, the controller 200 of each of the first, second, . . . , and $N^{th}$ battery packs 100, 102, . . . , and N determines that other battery packs are attempting to set themselves as the master battery pack and checks if a message of indicating that other battery packs set themselves as the master battery pack is received (step 312). Then, the controller 200 sets its own battery pack as the slave battery pack after it has received the message of setting the master battery pack, and stops the process for setting the master battery pack (step 314).

If the communication lines are at the first level (high level) for the first desired time RXTH, the controller 200 of each of the first, second, . . . , and $N^{th}$ battery packs 100, 102, . . . , and N determines that other battery packs do not currently attempt to set themselves as the master battery pack and outputs signals of the second level (low level) through the communication lines for the second desired time TXLTA (step 302). Then, when the second desired time TXLTA lapses, the controller 200 outputs the signal of the first level (high level) through the Next, the controller 200 of each of the first, second, . . . , and $N^{th}$ battery packs 100, 102, . . . , and N checks if the communication lines are at the second level (low level) (step 306). Here, even though a plurality of battery packs simultaneously attempt individually to set themselves as the master battery pack, the communication lines can be maintained to be at the second level (low level) according to whether other battery packs attempt to set themselves as the master battery pack because the second desired times are differently set to every battery packs.

If the communication lines are at the second level (low level), the controller 200 of one of the first, second, . . . , and $N^{th}$ battery packs determines that other battery packs are attempting to set themselves as the master battery pack, and checks if a message indicating that another battery pack is set as the master battery pack (step 312). If the message of indicating that another battery pack is set as the master battery pack is received, the controller 200 sets its own battery pack as the slave battery pack and stops the process for setting the master and slave battery packs (step 314).

Otherwise, if the communication lines are at the first level (high level), the controller 200 of one of the first, second, . . . , and $N^{th}$ battery packs 100, 200, . . . , and N determines that other battery packs do not attempt to set. themselves as the master battery pack (step 308). Then, the controller 200 sets its own battery pack as the master battery pack and transmits a message of indicating that its own battery pack has been set as the master battery pack to other battery packs (step 310).

As described above, according to the present invention, the battery packs provided for the multi-battery pack system set themselves as the master battery pack and the slave battery packs when the battery pack is activated or when it is required to set the master and slave battery packs. Thus, it is possible to remove the problems caused by fixing the master and slave battery packs, in advance.

The present invention can rapidly reset the battery packs as a master battery pack and slave battery packs even though a previous master battery pack is detached from the electric device or malfunctions during use of a multi-battery pack system.

Figure 4:
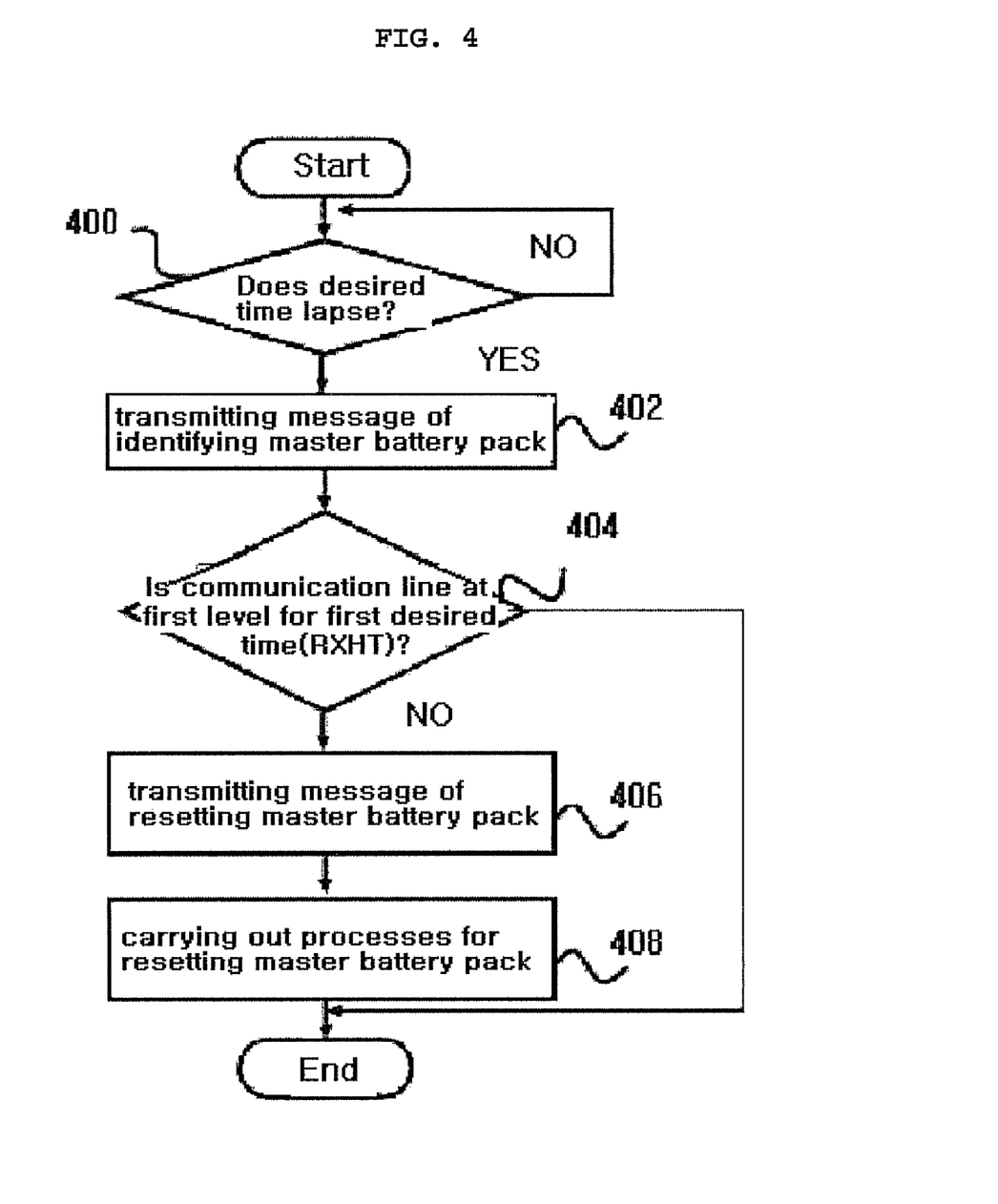
FIG. 4 is a flowchart illustrating processes for detecting absence of the master battery pack according to the preferred embodiment of the present invention.

Hereinafter, the processes for identifying absence of the master battery pack and resetting the battery packs as the master and slave battery packs will be described in detail with reference to FIG. 4.

The controller 200 of one of the slave battery packs transmits to the master battery pack a message of identifying the master battery pack whenever the third desired time calculated by an inner timer (not shown) lapses (steps 400 and 402). Here, the controller of the master battery pack received the message of identifying the master battery pack, outputs the signal of the second level according to the message of identifying the master battery pack.

After transmitting the message of identifying the master battery pack, the controller 200 of one of the slave battery packs checks if the communication lines are at the first level (low level) for the first desired amount of time RXHT (step 404).

If the communication lines are not at the first level (high level) for the first desired time RXHT, the controller 200 of one of the slave battery packs transmits the message of resetting the master battery pack to the entire battery packs 100, 102, ..., and N (step 406). Then, the controller 200 carries out processes for resetting the master battery pack illustrated in FIG. 4 (step 408).

Figure 5:
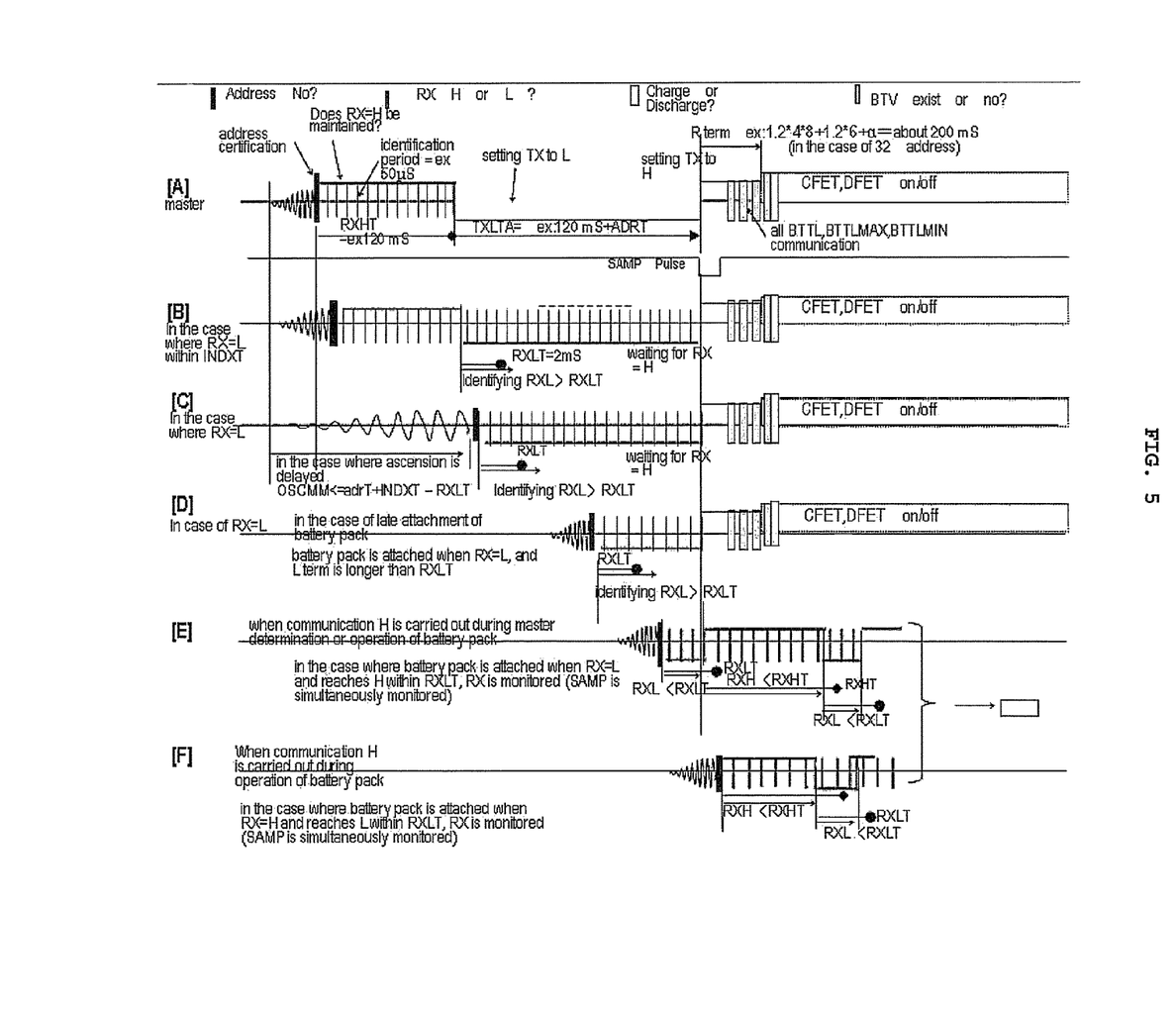
FIG. 5 is a view showing waveforms of a communication line according to the preferred embodiment of the present invention.

Hereinafter, the operation of the present invention will be described in detail with reference to FIG. 5.

According to FIG. 5A, one battery pack is activated and then outputs a signal of the second level for the second desired time if the communication lines are at the first level (high level) for the first desired amount of time RXHT. Next, the battery pack sets itself as the master battery pack after the communication line identifies the level, and controls the charging and discharging of the slave battery packs. On the other hand, one battery pack is set as the slave battery pack if the second desired amount of time TXLTA is shorter than that for other battery packs. However, if the second desired amount of time TXLTA is longer than that for other battery packs, the battery pack is set as the master battery pack. That is, the battery pack having the longest second desired amount of time TXLTA is set as the master battery pack.

FIG. 5B is a view showing waveforms of the communication lines in a battery pack approaching the second. level (low level) within the first desired time RXTH. In FIG. 5B, if one battery pack approaches the second level (low level), but other battery packs maintains the first level (high level), the battery pack determines that other battery packs are attempting individually to set themselves as the master battery pack. As a result, the battery pack sets itself as the slave battery pack. In other words, if any battery pack maintains the first level for the first desired time RXTH, it may be set as the master battery pack.

FIG. 5C is a view showing waveforms of the communication lines of a battery pack which operates late in comparison with other battery pack. Since the battery pack operates late, and cannot identify the duration of the first level (high level), it is set as the slave battery pack.

FIG. 5D is a view showing waveforms of the communication lines of a battery pack which is mounted later in the multi-battery pack system.

The battery pack is activated and identifies if the level of the communication lines is the first level for the first desired time RXHT. While the battery pack is mounted, another pack is attempting to set itself as the master battery pack before the first desired time lapses. In this case, the battery pack is set as the slave battery pack.

FIG. 5E is a view showing waveforms of communication lines of one battery pack when another battery pack is activated, in this state that the battery pack attempts to set itself as the master battery pack so as to output a signal of the second level (low level).

The battery pack is activated while the master battery pack is set, and then identifies if the communication lines are at the first level for the first desired time. Since the level of the communication lines is already changed by any battery pack into the second level, the battery pack sets itself as the slave battery pack.

FIG. 5F is a view showing waveforms of the communication lines of any battery pack which is activated when the communication lines approaches the first level by the communication between the battery packs.

Since a time in which the communication lines are continuously maintained in the first level by the communication between the battery packs is shorter than the first and second desired lengths of time, the battery pack, which is mounted during the communication, sets itself as the slave battery pack.

The embodiment of the present invention includes media which can be read by a computer and have program instructions to perform the operation realized by various computers. The media, which the computer can read, may include the program instructions, data files, data structure, and combination thereof. The program instructions of the media may be specially designed and configured, or already known to those skilled in the computer software field.

According to the present invention as described above, the battery packs provided for the multi-battery pack system can be set as the master battery pack and the slave battery packs by themselves when they wake up or are required to set the master battery pack and the slave battery packs. Therefore, there is an advantage in that many problems, which are caused by fixing the master battery pack, can be prevented in advance.

According to the present invention as described above, even though the master battery pack is detached from the multi-battery pack system or malfunction during use of the multi-battery pack system, it is possible to rapidly reset the master and slave battery packs. Thus, the present invention enables the. multi-battery pack to operate normally even if the multi-battery pack is not repaired.

According to the present invention, the battery packs provided for the multi-battery pack system can be set as the master and slave battery pack by themselves. Thus, there is another advantage in that the battery packs can be easily mounted and detached on/from the multi-battery pack system.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A battery pack constructing a multi-battery pack system, the battery pack comprising:
    a communication line for providing a pathway for communication of the battery pack with other battery packs; and
    a controller for checking if the communication line is maintained at a first level for a first desired amount of time when an activation signal or a message of setting a master battery pack is received, outputting signals of a second level to the communication line for a second desired amount of time when the communication line is maintained at the first level for the first desired amount of time, and setting the battery pack as the master battery pack.

2. The battery pack as claimed in claim 1, wherein the controller outputs the signals of the first level to the communication line when the second desired amount of time lapses while checking if the communication line is at the first level, and sets the battery pack as the master battery pack when the communication line is maintained with the first level.

3. The battery pack as claimed in claim 2, wherein the second desired amount of time is differently set for every battery pack.

4. The battery pack as claimed in of claim 1, wherein the controller sets the battery pack as a slave battery pack if the communication line is not maintained at the first level for the first desired amount of time when the activation signal or the message of setting the master battery pack is received, or if the level of the communication line is not the first level when the signals of the first level are outputted to the communication line as the second desired amount of time lapses.

5. The battery pack as claimed in claim 4, wherein the controller transmits a message of identifying the master battery pack to the master battery pack at a desired time interval after setting the battery pack as the slave battery pack, checks if the level of the communication line is a desired level according to the message of identifying the master battery pack, and transmits a message for resetting the master battery pack to other battery packs if the communication line is not at the desired level.

6. A multi-battery pack system comprising a plurality of battery packs as claimed in claim 1,
the battery pack comprising:
a communication line for providing a pathway for communication of the battery pack with other battery packs; and
a controller for checking if the communication line is maintained at a first level for a first desired amount of time when an activation signal or a message of setting a master battery pack is received, outputting signals of a second level to the communication line for a second desired amount of time when the communication line is maintained at the first level for the first desired amount of time, and setting the battery pack as the master battery pack.

7. The multi-battery pack system as claimed in claim 6, wherein the controller checks if the communication line is maintained at the first level for the first desired amount of time when the activation signal or the message of setting the master battery pack is received, outputs the signals of the second level to the communication line for the second desired amount of time when the communication line is maintained at the first level for the first desired amount of time, outputs the signals of the first level to the communication line when the second desired amount of time lapses while checking if the communication line is at the first level, and sets the battery pack as the master battery pack when the communication line is maintained with the first level.

8. The multi-battery pack system as claimed in claim 7, wherein the second desired amount of time is differently set for every battery pack.

9. The multi-battery pack system as claimed in of claim 6, wherein the controller sets the battery pack as a slave battery pack if the communication line is not maintained at the first level for the first desired amount of time when the activation signal or the message of setting the master battery pack is received, or if the level of the communication line is not the first level when the signals of the first level are outputted to the communication line as the second desired amount of time lapses.

10. The multi-battery pack system as claimed in claim 9, wherein the controller transmits a message of identifying the master battery pack to the master battery pack at a desired time interval after setting the battery pack as the slave battery pack, checks if the level of the communication line is a desired level according to the message of identifying the master battery pack, and transmits a message for resetting the master battery pack to other battery packs if the communication line is not at the desired level.

11. A method for controlling battery packs constructing a multi-battery pack system, the method comprising:
a first step of checking if a communication line is maintained at a first level for a first desired time when an activation signal or a message of setting a master battery pack is received; and
a second step of outputting signals of a second level to the communication line for a second desired amount of time when the communication line is maintained at the first level for the first desired amount of time, and setting a battery pack as a master battery pack.

12. The method as claimed in claim 11, wherein the second step includes the sub-steps of:
outputting the signals of the second level to the communication line for the second desired amount of time when the communication line is maintained at the first level for the first desired amount of time;
outputting the signals of the first level to the communication line when the second desired amount of time lapses while checking if the communication line is at the first level; and
setting the battery pack as the master battery pack when the communication line is maintained with the first level.

13. The method as claimed in claim 12, wherein the second desired amount of time is differently set for every battery pack.

14. The method as claimed in claim 11, further comprising a step of setting the battery pack as a slave battery pack if the communication line is not maintained at the first level for the first desired amount of time when the activation signal or the message of setting the master battery pack is received, or if the level of the communication line is not the first level when the signals of the first level are outputted to the communication line as the second desired amount of time lapses.

15. The method as claimed in claim 14, further comprising the steps of transmitting a message of identifying the master battery pack to the master battery pack at a desired time interval after setting the battery pack as the slave battery pack, checking if the level of the communication line is a desired level according to the message of identifying the master battery pack, and transmitting a message for resetting other battery packs to the master battery pack if the communication line is not at the desired level.

* * * * *